(12) United States Patent
Bleck et al.

(10) Patent No.: US 9,088,378 B2
(45) Date of Patent: Jul. 21, 2015

(54) METHOD FOR TRANSMITTING A DIGITAL SIGNAL IN INVERSE MULTIPLEXING, PARTICULARLY VIA AN OPTICAL TRANSPORT NETWORK, AND RECEPTION DEVICE FOR A SYSTEM TO CARRY OUT THE METHOD

(75) Inventors: Oliver Bleck, Geretsried (DE);
Cornelius Fürst, Fürstenfeldbruck (DE);
Andreas Färbert, München (DE);
Jörg-Peter Elbers, Fürstenfeldbruck (DE)

(73) Assignee: Adva Optical Networking SE, Meiningen (DE)

( * ) Notice: Subject to any disclaimer, the term of this patent is extended or adjusted under 35 U.S.C. 154(b) by 170 days.

(21) Appl. No.: 13/105,752

(22) Filed: May 11, 2011

(65) Prior Publication Data
US 2011/0280575 A1    Nov. 17, 2011

(30) Foreign Application Priority Data

May 17, 2010   (DE) .......................... 10 2010 020 772

(51) Int. Cl.
*H04J 3/14* (2006.01)
*H04L 1/00* (2006.01)
(Continued)

(52) U.S. Cl.
CPC ................. *H04J 3/14* (2013.01); *H04L 1/0045* (2013.01); *H04L 1/20* (2013.01);
(Continued)

(58) Field of Classification Search
CPC .............. H04J 14/0295; H04J 14/0297; H04J 14/0227; H04J 14/0294; H04J 2203/006; H04J 3/14; H04B 10/0775; H04B 17/00
USPC ........................................................ 375/224
See application file for complete search history.

(56) References Cited

U.S. PATENT DOCUMENTS 6,438,717 B1    8/2002  Butler et al.
(Continued)

FOREIGN PATENT DOCUMENTS

GB         2305083 A  *  3/1997  ............ H03M 13/00

OTHER PUBLICATIONS

IEEE Std 802.3ae-2002, IEEE Standard for Information Technology—Telecommunications and information exchange between systems—Local and metropolitan networks—Specific requirements; Part 3: Carrier Sense Multiple Access with Collision Detection (CSMA/CD) Access Method and Physical Layer Specifications; Amendment 1: Media Access Control (MAC) Pa.*

(Continued)

*Primary Examiner* — Joseph Bednash

(57) ABSTRACT

The invention relates to a method for the transmission of a digital signal in inverse multiplexing, particularly via an Optical Transport Network (OTN), in which a digital signal to be transmitted, which is split into a certain number M of several sub-signals, where each sub-signal of a transmit side of a transmission line assigned exclusively to this sub-signal is transmitted to a reception side of the assigned transmission line, and in which, on the reception side of the transmission lines, the sub-signals are reassembled to a digital reception signal. According to the invention, on the reception side, bit errors in the digital reception signal including their position in the digital reception signal are detected, and from the detected position of the bit errors and from the assignment of the individual bytes of the digital reception signal to the respective sub-signals and transmission lines, which assignment is also known on the reception side, it is determined to which sub-signal the detected bit errors were assigned. From this one or more parameters are determined, which characterize the transmission quality of the transmission lines assigned to each sub-signal and/or allow inferences to be drawn regarding which error mechanisms of the transmission line in question impact its transmission quality. In addition, the invention relates to a reception device for a system for the transmission of a digital signal in inverse multiplexing, which carries out this method.

20 Claims, 5 Drawing Sheets

(51) Int. Cl.
*H04L 1/20* (2006.01)
*H04L 25/14* (2006.01)
*H04J 3/16* (2006.01)

(52) U.S. Cl.
CPC ............... *H04L 25/14* (2013.01); *H04J 3/1652* (2013.01); *H04J 2203/006* (2013.01); *H04J 2203/0094* (2013.01)

(56) References Cited

U.S. PATENT DOCUMENTS

| | | | |
|---|---|---|---|
| 2003/0107999 | A1 | 6/2003 | Peleg et al. |
| 2004/0037569 | A1* | 2/2004 | Kamalov et al. ............... 398/162 |
| 2004/0047408 | A1* | 3/2004 | Koenenkamp et al. ........ 375/224 |
| 2006/0253757 | A1* | 11/2006 | Brink et al. .................... 714/738 |
| 2007/0014572 | A1 | 1/2007 | Sada et al. |
| 2009/0172494 | A1* | 7/2009 | Iima ............................... 714/752 |

OTHER PUBLICATIONS

"Interfaces for the Optical Transport Network (OTN)," ITU-T Standard, Dec. 22, 2009, pp. 1-218, No. G.709/Y.1331, Geneva, CH.

"IEEE Standard for Information Technology—Telecommunications and Information Exchange Between Systems—Local and Metropolitan Area Networks—Specific Requirements," IEEE Standard, 2002, pp. 1-516, Piscataway, NJ. (529 pages).

"IEEE Standard for Information Technology—Telecommunications and Information Exchange Between Systems—Local and Metropolitan Area Networks—Specific Requirements," IEEE Standard, 2002, pp. 248 & 321, paragraph 46.1.1, illustration 49-4, Piscataway, NJ. (2 pages).

"Interfaces for the Optical Transport Network (OTN)," ITU-T Standard, Dec. 22, 2009, pp. 160-162, Annex C, No. G.709/Y.1331, Geneva, CH.

* cited by examiner

|   | 1 | 2 | 3 | 4 | 5 | 6 | 7 | 8 | 9 | 10 | 11 | 12 | 13 | 14 | 15..3816 | 3817 | ... | 3824 | 3825..4080 |
|---|---|---|---|---|---|---|---|---|---|---|---|---|---|---|---|---|---|---|---|
| 1 | RES | PM & TCM | TCM ACT | FAS | | | | | | | | | | | Used OPU4 payload area | | | | FEC parity check bytes |
| 2 | TCM3 | TCM2 | | | | TCM6 | | | TCM5 | | | TCM4 | | FTFL | | FS | ... | FS | |
| 3 | GCC1 | GCC2 | | | | APS/PCC | | | TCM1 | | | PM | | EXP | | FS | ... | FS | |
| 4 | | | | | | | | | | | RES | | | | | FS | ... | FS | |

Fig. 2

METHOD FOR TRANSMITTING A DIGITAL SIGNAL IN INVERSE MULTIPLEXING, PARTICULARLY VIA AN OPTICAL TRANSPORT NETWORK, AND RECEPTION DEVICE FOR A SYSTEM TO CARRY OUT THE METHOD

TECHNICAL FIELD OF THE INVENTION

The invention relates to a method for transferring a digital signal in inverse multiplexing, particularly via an Optical Transport Network (OTN), as well as to a reception device for a system to carry out the method.

BACKGROUND OF THE INVENTION

The transmission of a digital signal in inverse multiplexing allows the use of several parallel transmission lines, particularly several parallel running optical fibers, with smaller bandwidth than would be required for the transmission of the digital signal. Here, the digital signal is split into several sub-signals, which in each case are transferred via one of the parallel running transmission lines from a transmit side to a reception side of the transmission lines. On the reception side, the sub-signals are assembled again to a digital reception signal, taking into consideration the correct sequence of the bits or bytes which were transmitted via different transmission lines. The transmission in inverse multiplexing thus allows the continuing use of existing parallel transmission lines (here, the term "parallel" strictly speaking only expresses that the individual transmission lines have a common, transmit-side starting point and a common, reception-side end point), even if a digital transmit signal requires a broader bandwidth than the bandwidth made available by each individual transmission line. Existing transmission units and receiving units of the individual transmission lines can optionally continue to be used, particularly those parts which carry out, for example, a signal conversion or a signal processing of the individual sub-signals.

For the optical signal transmission via an Optical Transport Network (OTN), the international standard ITU-T G.709/ Y.1331 establishes how the transmission or the signal processing must occur at the transmit-side and reception-side interfaces.

The digital signal corresponding to a certain service, for example, an Optical-channel Transport Unit of Category 3 or 4 (OTU3 or OTU4 Service), is split for the transmission in inverse multiplexing into individual parts, the so-called Logical Lanes (LL), where then, in each case, a single or several LL's can be combined to a sub-signal. Each sub-signal generated in this way can then be transmitted via respective assigned transmission lines from the transmit-side end to the reception-side end. In the process, the running times of the individual sub-signals may differ greatly, so that, for assembling the sub-signals to a digital reception signal corresponding to the digital transmit signal, a synchronization of the sub-signals must take place in such a way that the individual blocks of bytes which in each case are assigned to an LL have the same sequence in the digital reception signal as in the digital transmit signal.

In contrast to the situation with a single digital signal transmitted via a single assigned transmission line, for the transmission of a signal in inverse multiplexing, the performance of the overall transmission line is influenced by parameters of several parallel transmission lines. Therefore, it is necessary or at least desirable here to determine parameters that characterize the transmission quality of the individual parallel transmission lines. These parameters can then be used to influence all or selected transmission lines, or the digital transmit signal in question, in each case separately in such a way that the result is an optimal performance via the transmission line in question or via the overall transmission line.

Naturally, during signal transmission in inverse multiplexing, it is also possible to determine the performance of the individual parallel transmission lines in the usual way by evaluating the individual sub-signal, for example, with regard to the bit error rate, before they are assembled again to the digital reception signal. However, this procedure is associated with corresponding high costs, particularly costs associated with the switching technology. Moreover, each signal in itself would have to be designed in such a way that recognition or correction of transmission errors is possible on the reception side.

SUMMARY OF THE INVENTION

Therefore, the present invention provides a method for the transmission of a digital signal in inverse multiplexing, particularly via an Optical Transport Network (OTN), with which parameters can be determined in a simple way, which characterize the transmission quality of the transmission lines assigned to each sub-signal or allow inferences to be drawn regarding which error mechanisms of the transmission line in question impact the transmission quality. Moreover, the invention provides a reception device to implement such a signal transmission system in which the method according to the invention is carried out.

The invention is based on the recognition that it is advantageously possible to use information also present on the reception side of a signal transmission system using inverse multiplexing, with this information being about the assignment of byte groups or byte positions of the signal to be transmitted to the sub-signals which are transmitted in each case via an assigned transmission line, for the purpose of evaluating the transmission quality of the respective individual transmission lines.

For this purpose, bit errors in the digital reception signal, including the position of the bit error (at least the byte position of the bit error) are determined, and in each case the associated sub-signal is determined. As a result, it is possible to determine, by means of an evaluation of the digital reception signal, on which one of the transmission lines the bit error was generated.

Suitable parameters for the evaluation of the transmission quality of the individual transmission lines are, for example, the bit error rate or the specific bit error rates for the cases where a bit with the value of logical "0" or logical "1" was transmitted incorrectly. Optionally, certain bit errors in certain patterns (that is, with certain previous or subsequent bit values) can also be evaluated, and based on that evaluation inferences regarding the causes of errors can be drawn.

The parameters for the quality of the signal transmission over the individual transmission lines that are determined in this way can also be used to control or readjust transmission properties in each case. For example, the threshold of the receiver at the end of each transmission line for detecting "0" or "1" can be changed as a function of a parameter that has been determined in this way, or it can be adjusted in a closed regulation loop to an optimal value, which results, for example, in the minimum bit error rate for the transmission line in question.

The digital transmit signal can have a frame structure, and be split, for example, according to the known OTN standard transmit signal into several Logical Lanes, which in each case contain a certain number of bytes of the digital transmit signal. In each case, one or more Logical Lanes can here be combined to form in each case one of the several sub-signals, where the assignment of the bytes of the transmit signal to the Logical Lanes, and the assignment of the Logical Lanes to the sub-signals, is also known on the reception side.

It should be mentioned here that for the present description, the term Logical Lanes (LL), which taken from the OTN nomenclature, is used in a broader meaning. Below, LL denotes a real or virtual data flow which is generated by the splitting the data or bytes of the transmit signal. One or more LL's can in each case be combined to a sub-signal which is transferred via an associated transmission line. The assignment of the data of the transmission signal to the sub-signals must naturally not occur in two actually separated, consecutive steps, by first generating the LL and then the sub-signals from the LL. Rather, by using the corresponding assignment specifications, the sub-signals can also be generated directly. In particular, if only a single LL is used for a sub-signal, that is, if the sub-signal consists of only a single LL, and thus the data flow of the sub-signal is identical to the real or virtual data flow of the LL in question, the generation of the sub-signal can naturally be simplified accordingly. As a trivial case, the invention also covers the alternative where all the sub-signals in each case consist of only a single LL. In this case, the data flow of all the sub-signals is in each case identical with the respective (real or virtual) data flows of the LL, so that in this case, no distinction needs to be made any longer between an LL and the respective sub-signal.

According to an embodiment of the method according to the invention, the digital transmit signal can be scrambled before splitting into sub-signals, and on the reception side, the digital reception signal can be descrambled, before the detection of bit errors in the previously known bit structure occurs. In general, the scrambling achieves an equal distribution of bit values with logical "0" and logical "1."

To determine the specific bit error rates for the bit values of logical "0" and logical "1" for selected or for all the transmission lines, it is possible, in this case, to compare the still scrambled reception signal, or the newly identically scrambled reception signal which had already been descrambled previously, at those bit positions of the previously known bit structure on which bit errors had been detected, with the descrambled reception signal (naturally, the comparison here can be limited to the acquisition of the values of the bits at the positions of the detected bit errors). In this way, it is possible to establish that the incorrectly transmitted bit was a logical "0" bit or a logical "1" bit.

According to an embodiment of the method according to the invention, a previously known bit structure can be written into one or more predetermined blocks of bytes of one or more frames of the digital transmit signal. On the reception side, the previously known bit structure in the corresponding specified blocks can be acquired by bytes of the digital reception signal, and possible bit errors in the known bit structure can be detected. From the position of a known bit error in the reception signal, in turn, it is possible to determine to which sub-signal and thus to which transmission line the detected bit errors should be assigned.

The predetermined blocks of bytes into which the known bit structure is written are preferably blocks which are such that they are not needed for the transmission of the useful signal. For example, the bit structure can be written in "Fixed Stuff" (FS) bytes of each one of the four lines of an OTU4 frame, because these bytes (in each case eight bytes of the numbers 3817 to 3824) are not needed with such an inverse multiplexing structure. If forward error correction (FEC) is not used, then it is also possible to consider using as alternative positions the bytes of the frame which are reserved for FEC (bytes with the numbers 3825 to 4080 of each line).

The length of the known bit structure can be chosen in such a manner that the bit structure can be transmitted distributed over the specified blocks of bytes of several frames. As a result, a sufficiently long previously known pattern can be chosen, which has a sufficiently large number of different sub-bit sequences, for example, to transmit a bit error rate that is statistically as applicable as possible for the parts of the useful signal transmitted via the transmission lines.

To be able to determine, on the reception side, in the simplest way the start of the known bit structure, the beginning of the bit structure can be placed preferably on the first given byte of a frame of a correspondingly structured transmit signal, where the frame preferably has a specified marker known on the reception side. For example, the start of the bit structure can be placed on the first given byte of the given blocks of bytes for the reception of the bit structure of a frame, which has a marker (which can be defined as desired) with a known value. For example, the bit structure can start in each case in a frame in which the Logical Lane marker is equal to zero or has another known value.

It should be pointed out here that the term frame structure in the present description is not intended to cover only predefined frames in the sense of the OTN standard, but all digital signals which have a frame or packet structure, such as, for example, also according to the IEEE 802.3 standard.

The positions of the given blocks of bytes within the frame can be chosen preferably in such a way that the bytes of the known bit structure are distributed, taking into consideration the assignment prescription for the bytes of the frames to the Logical Lanes, or of the Logical Lanes to the transmission lines, substantially uniformly over the Logical Lanes or substantially uniformly over the sub-signals (and thus over the transmission lines). As a result, it is possible to make assertions that are as applicable as possible regarding the transmission quality of all the transmission lines.

According to an embodiment of the invention, the position of the one or more given blocks of bytes can remain constant within each frame, and the assignment of the bytes or the blocks and bytes to the Logical Lanes can occur according to a rolling system. As a result, it is achieved that the same sub-bit structures (of the given bit structure) are not always assigned to the same Logical Lanes, and thus transmitted via the same transmission lines. This in turn contributes to an assertion that is as applicable as possible regarding the transmission quality of all the transmission lines.

According to a preferred embodiment of the method according to the invention using a known bit structure in the digital signal to be transmitted, the known bit structure is transmitted successively a number of times at least corresponding to the number N of Logical Lanes. At the same time, the rolling system for the assignment of the bytes or the blocks of bytes to the Logical Lanes, and the position of the one or several predetermined blocks of bytes within each frame, are chosen in such a way and adjusted to each other in such a way that after N times transmitting the known bit structure, the bit structure in each case is contained once completely within each Logical Lane.

As a result, an assertion regarding the transmission quality of the individual transmission lines in each case be made with approximately the same validity of assertion, even if the same number of Logical Lanes is not transmitted via each transmission line.

According to an additional embodiment of the invention, the digital transmit signal to be transmitted can contain a redundancy to allow forward error correction, so that, on the reception side, forward error correction can be applied to the digital reception signal. By means of the forward error correction or by the comparison of the uncorrected signal with the error corrected signal, the bit position or at least the byte position of each correctable bit error within the respective frame of the reception signal can be determined. From the position of the bit error in the reception signal, in turn, it is possible to determine to which Logical Lane or to which sub-signal the detected bit error should be assigned.

Here, it is thus not necessary to write a known bit structure into the digital transmit signal. Since forward error correction is already used in many cases, this embodiment of the invention also results in only little additional cost to monitor or to control or to regulate the performance of the individual transmission lines.

If, in addition, the digital transmit signal is scrambled before the splitting into the sub-signals, and the digital reception signal is descrambled again on the reception side, then this can also be taken into consideration in corresponding embodiments of the invention, if the specific bit error rates or specific bit errors are to be determined. For this purpose, in addition to the detection of a bit error (including its bit position) in the descrambled digital reception signal, a determination is also carried out in the still scrambled digital reception signal whether the bit value in the position of the incorrectly transmitted bit is equal to logical "0" or logical "1."

If the above explained method is used, in which, a known bit structure must be contained in the signal to be transmitted, then the detection of bit errors in the previously known bit structure naturally must occur before the descrambled digital reception signal is subjected to a possibly also present forward error correction.

If the bit errors are detected by means of forward error correction, and corrected, and if the specific bit error rates for the bit values of logical "0" and logical "1" are determined for selected or all the transmission lines, or additional information on the actual bit error is determined, then several possibilities exist here.

For example, by means of the forward error correction, the position of a bit error in the descrambled digital reception signal and from this the value of the (incorrectly) transmitted bit in the error position can be determined in the still scrambled uncorrected digital reception signal.

However, it is also possible to compare the still scrambled (or still incorrect) digital reception signal with the previously descrambled error corrected reception signal, which has been again scrambled identically.

In both cases, it is possible to determine in this manner whether the given incorrectly transmitted bit (in the digital, already scrambled transmit signal) was a logical "0" bit or a logical "1" bit, or whether the incorrectly transmitted bit in the digital (still scrambled) reception signal is a logical "0" bit or a logical "1" bit.

Since the splitting of the frames of the digital transmission signal in the Logical Lanes usually occurs byte-wise or in groups of bytes, it can also be sufficient, for the determination of the specific bit error rates, if, instead of the actual bit position, the byte position or the position of the group of bytes is determined. However, if the type of bit error including the adjacent bit structure should be determined in further detail, then the actual bit position must be detected.

Additional embodiments of the invention are given in the dependent claims.

BRIEF DESCRIPTION OF THE DRAWINGS

The invention is explained in further detail below with reference to the embodiments shown in the drawing. The figures in the drawing show:

FIG. 2, a schematic representation of a special structure of a frame of an OTU4 service/signal according to the standard ITU-T G.709/Y.1331 (which is generated during the use of a certain ODU multiplexing structure);

DETAILED DESCRIPTION OF PREFERRED EMBODIMENTS

Figure 1:
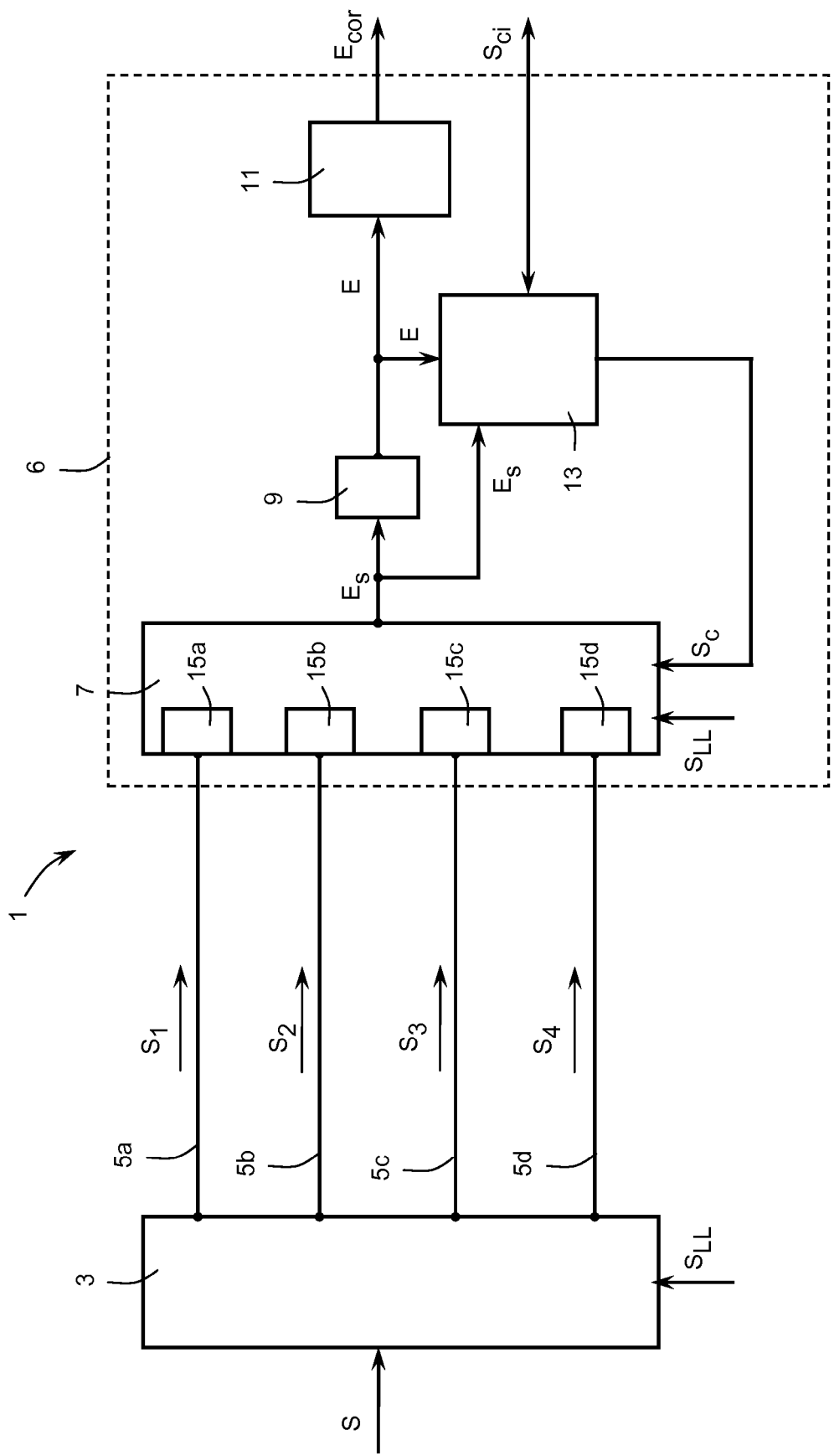
FIG. 1, a schematic block diagram of the functional units, which are essential to understand the invention, of a first embodiment of a system for transmission of a digital signal in inverse multiplexing.

The system 1, which is schematically represented in FIG. 1, for the transmission of a digital signal in inverse multiplexing, particularly via an Optical Transport Network (OTN), comprises a transmission device 3, which is connected via several, in the embodiment four physical transmission lines 5a, 5b, 5c, 5d, with a reception device 6. The reception device 6 comprises a receiving unit 7, a descrambler 9, a forward error correction unit (FEC unit) 11 and a detector unit 13.

A digital transmit signal S, which usually has a frame structure, is sent to the transmission device. The digital transmit signal S can have, for example, the frame structure of an OTU4 service according to the international standard ITU-T G.709/Y.1331—Interfaces for the Optical Transport Network (OTN). Such a representation is shown in FIG. 2. Each frame of the digital transmit signal S consists here of four rows or lines of 4080 bytes each (which are naturally contained sequentially in the transmit signal S). Certain bytes are assigned to certain functions. For example, the first seven bytes of the first line of a frame are the bytes of the Frame Alignment Signals (FAS) which are used for synchronization purposes. However, there is no need to go into further detail in this description regarding the individual meanings of special bytes within the OTU4 frame represented in FIG. 2.

Although, in the context of the following description of the figures, the reference is essentially to the OTN standard, it is possible to use or apply the general principle of the invention also to other standards or any signal shapes.

For transmission of the digital transmit signal S in inverse multiplexing via the four parallel transmission lines 5a, 5b, 5c, 5d, the transmission device 3 splits the digital transmit signal S into four sub-signals $S_1$, $S_2$, $S_3$ and $S_4$, and it sends the latter to the transmission lines 5a, 5b, 5c, 5d. Before the splitting into the sub-signals $S_1$, $S_2$, $S_3$ and $S_4$, the transmission device 3 can scramble the digital transmit signal S, for example, with the purpose of achieving an equal distribution of the logical states of the signal.

For the splitting of the transmit signal S into the sub-signals $S_1$, $S_2$, $S_3$, $S_4$, the international standard ITU-T G.709/Y.1331 provides that in each case groups of sequential bytes of the transmit signal S are first assigned in each case to a certain (virtual) logical sub-signal, a so called Logical Lane. The standard, in its newest version, provides for this being an OTN service, that is, for the purpose of the inverse multiplexing (that is, transmission of the OTN signal via several physical interfaces), a transmit signal S can be split into so-called Logical Lanes (LL). Currently, four LL are defined for an OTU3 service as well as 20 LL for an OTU4 service.

The assignment of the bytes of the transmit signal to the LL can be carried out by the transmission device 3, for example, in such a way that in each case groups of 16 sequential bytes are combined, and each group is assigned to an LL. For example, the first group of 16 bytes of a frame of an OTU4 service can be assigned to the LL with the number 0 (abbreviated below as LL0), the next group of 16 bytes to LL1, etc.

The LL can then be transmitted by the transmission device either individually as sub-signal $S_1, S_2, S_3, S_4$ or combined in each case to a sub-signal $S_1, S_2, S_3, S_4$ via a certain transmission line 5a, 5b, 5c, 5d. The combining of several LL can take place, for example, in such a way that in each case one or more blocks of bytes are arranged sequentially in a certain or fixed sequence (with respect to the numbers of the LL) in the respective sub-signal $S_1, S_2, S_3, S_4$.

The assignment of the individual 16-byte blocks to the LL can be established as a function of a revolving counter. The counter can always run from a start value to a maximum value, which is determined by the number of LL, where each group of bytes in each case is assigned the counter state which is assigned the corresponding group of bytes as the number of LL. The starting value of the revolving counter according to the OTN standard is equal to zero, but, in principle, it can be chosen as desired.

For this purpose, either defined bits of the Multi Frame Alignment Signal Byte (MFAS Bytes) of the OTN Overhead (OH) can be used (in the case of an OTU3 Service) or a so called Logical Lane Marker (LLM) is defined (for OTU4 Services), which is transmitted as part of the FAS byte of the OTN OH (for the positions of the individual functional bytes of an OTU4 frame, see FIG. 2).

For example, the LLM can in each case revolve between 0 and 239, that is, it is increased, starting at 0 for the first frame of a multi-frame structure with 240 frames, by one for each subsequent frame. The start value $Z_0$ for the counter revolving between 0 and N−1 (N should very generally stand for the number of defined LL), which determines the assignment of the blocks of bytes to the LL, can be determined from the value of the LLM according to the relation $Z_0$=LLM modulo 20

Thus, the first block of bytes (16 byte block in the represented example) of each frame of the multi-frame structure with 240 frames, in which the LLM is a multiple of 20, is assigned to LL0, and the following blocks to LL1, LL2, etc. The first block of bytes of each frame of this multi-frame structure, in which LLM is equal to 1 or a multiple of 20+1 (that is, LLM modulo 20=1), is assigned to LL1, and the following blocks to LL2, LL3, etc. In this way, one obtains a rolling system, in which in each 240 frame structure, the assignment of the blocks of bytes of a frame to the LL is repeated twelve times.

Because the first byte of the known byte structure is written into the first byte of the reserved block of bytes of a frame with a known marker, namely with an LLM with a certain value, it is possible, on the reception side, for a simple synchronization to the known bit structure to occur. The reception device 6 must only check the corresponding mark (for example, the LLM) to determine which value it has, and from this it can then use the part of the known bit structure, which is received in this frame or the corresponding target assignment for the verification of the bit error.

The information how the assignment of the blocks of bytes of the digital transmit signal S to the LL and the assignment of the LL to the sub-signals $S_1, S_2, S_3, S_4$ occurs can be given in a fixed manner in the transmission device 3 (for example, stored), or sent to said transmission device by a unit, which is not shown in further detail, by means of a single $S_{LL}$. This information can naturally also be sent in the same way to the reception device 6, particularly the receiving unit 7.

Figure 3:
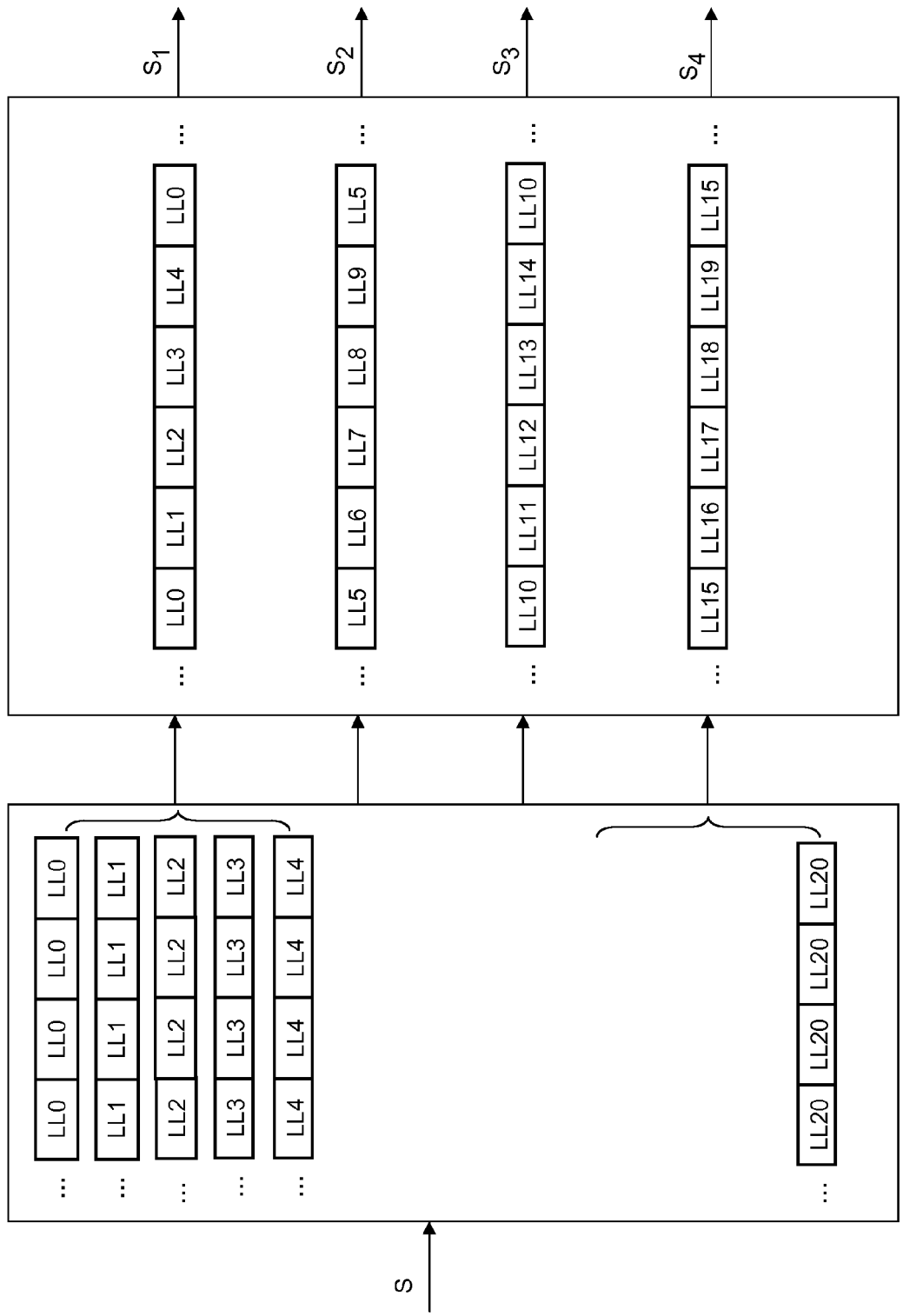
FIG. 3, a schematic representation to explain the splitting of a digital transmit signal into byte blocks of defined length and the assignment of the byte blocks to Logical Lanes, and to explain the assignment of Logical Lanes to one of four sub-signals in each case, where each sub-signal is transmitted via one of four parallel transmission lines.

FIG. 3 shows schematically the assignment of byte blocks (for example, 16-byte blocks) of the digital transmit signal S to the 20 Logical Lanes of an OTU4 service, and in each case the assignment of the five LL, in the represented example, to in each case one sub-signal $S_1, S_2, S_3, S_4$. Here, LL0-LL4 are assigned to the sub-signal $S_1$, LL5 to LL9 to the sub-signal $S_2$, LL10 to LL14 to the sub-signal $S_3$, and LL15-LL19 to the sub-signal $S_4$. In the sub-signal $S_1, S_2, S_3, S_4$, the bytes of blocks of the in each case five Logical Lanes are transmitted in each case in the represented, repeating sequence.

The assignment of the LL to the sub-signals can be static or optionally it can also be modified dynamically.

In such a structure, the possibility exists that the transmission device 3 describes defined bytes of a frame (whose position preferably remains fixed) with a bit structure which is also previously known. The bit structure can also comprise longer bytes or more bytes than corresponds to the number of defined (predefined) bytes of a single frame.

For example, the Fixed Stuff (FS) bytes 3817-3824 of each line of a frame are suitable as the position for the transmission of the previously known bit structure in a frame of an OTU4 Service (see FIG. 2). The FS bytes are not necessarily needed for the standardized transmission in inverse multiplexing, and can therefore be occupied, even if the solution is then no longer perfectly in compliance with the standard (according to the standard these bytes can strictly speaking not be used for other purposes and must be described according to a fixed specification).

Other positions, such as, for example, the use of ODU OH bytes (for example, bytes #1 . . . #8 of frame line #3) are also possible if the associated functionalities are not used. For example, if no forward error correction (FEC) is used, then it is also possible to consider using the bytes of the frames that are reserved for the FEC (bytes with the numbers 3825 to 4080 of each line) as alternative positions. In all cases, one must merely ensure that the bytes used fit block-wise into the 16-byte block structure of the LL, to be able to assign them again later.

If the FS bytes of the frame of an OTU4 Service are used for the transport of the previously known bit structure, and the length of the previously known bit structure is established in the case of the above explained multi-frame structure with 240 frames for an OTU4 Service to 384 byte, then this bit structure is transmitted exactly 20 times within 240 frames. Then the length of the bit structure is in this case 12 times 4 times 8 equals 384 bytes (12 frames, where in each one of the four lines of a frame 8 FS bytes are available for the reception of the bit structure).

If the above explained rolling system is also used for the assignment of the 16 byte blocks to the LL, then the specified bit structure can be obtained exactly once in each LL. If each sub-signal $S_1, S_2, S_3, S_4$ is formed from the same number of LL, then, in the same time unit, the same number of previously known bits (including on the reception side) is transmitted via the individual transmission lines 5a, 5b, 5c, 5d, so that in a reception-side evaluation of bit errors by a comparison of the possibly incorrectly transmitted, previously known bit structure within the digital reception signal E with the correct bit structure, the bit error probability for the individual transmission lines can be obtained in each with the same statistical significance or reliability.

Even if the numbers of the LL contained in sub-signals $S_1$, $S_2$, $S_3$, $S_4$ are different, the advantage with this system is that at least the entire previously known bit structure is contained at least once in each sub-signal, which verifies the transmission quality of each one of the transmission states $5a$, $5b$, $5c$, $5d$ in the same way (that is, with the same bit structure).

In the embodiment of a system 1, represented in FIG. 1, for the transfer of a digital signal in inverse multiplexing, the individual sub-signals $S_1$, $S_2$, $S_3$, $S_4$ are combined again on the reception-side end of the transmission lines $5a$, $5b$, $5c$, $5d$ to an at first still scrambled digital reception signal $E_s$. For this purpose, the reception device 7 must of course know how the assignment of the 16-byte block of the frame of the transmit signal S to the LL and the assignment of the LL to the sub-signals $S_1$, $S_2$, $S_3$, $S_4$ occurred. This will be assumed as the starting point below, where the synchronization or learning process which is required for this purpose and which can take place in the receiving unit 7 is not represented, because it is irrelevant for understanding the present invention.

The still scrambled reception signal $E_s$ generated in this way is sent to a descrambler 9, which reverses the scrambling process carried out in the transmission device 3, and in this manner generates the reception signal E. Forward error correction can be applied to the reception signal E, and the reception signal E is sent to the forward error correction unit (FEC unit) 11, which is connected after the descrambler, and generates an error corrected signal $E_{cor}$.

The reception signal E is sent simultaneously to a detector unit 13. The detector unit 13 also knows the byte positions of the bytes within the frame of the reception signal E, which contain the previously known bit structure, and compares the (corresponding relevant parts of the) bit structure with the (possibly incorrectly transmitted) bit structure that is actually contained in the respective bytes of the reception signal. In this way, the detector unit 13 can detect incorrectly transmitted bits and then determine the bit error rate for the entire transmission line.

Moreover, the detector unit can use the information on how the 16-byte blocks of the sending signal S were distributed over the LL and how the assignment of the LL to the sub-signals $S_1$, $S_2$, $S_3$, $S_4$ occurred, for the purpose of determining via which transmission line $S_1$, $S_2$, $S_3$, $S_4$ a defined relevant byte, in which a part of the previously known bit structure is contained, was transmitted.

In this way, the detector unit 13 can assign the detected bit error rates also in each case to the sub-signals $S_1$, $S_2$, $S_3$, $S_4$, or the respective transmission line, and determine for that purpose a bit error rate.

The assignment of the byte position to the LL can also occur for example by the fact that in each case the first byte or bit of a frame is determined and from this the fixed number of the bytes within the respective line of the frame can then be back calculated to the associated LL. For this purpose, it must naturally be known (at least implicitly) to the detector unit how the distribution of the transmit signal into the LL or the assignment of the LL to the sub-signals $S_1$, $S_2$, $S_3$, $S_4$ occurs within the transmission device 3.

For the present example of the use of the 8-byte block of the FS byte of each line of a frame of an OTU4 Service, the following specification results for the assignment of the 8-byte blocks of the 1 to 4 lines of a frame to the respective LL:

$LL\#=([LLM \text{ modulo } 20]+X) \text{modulo } 20$ with
  X=18 for the 8-byte block of the first line of the frame
  X=13 for the 8-byte block of the second line of the frame
  X=8 for the 8-byte block of the third line of the frame
  X=3 for the 8-byte block of the fourth line of the frame
where LL# denotes the LL of the number #, and X a constant whole number as a function of the line of the 8-byte block of the FS byte. In this way, the detector unit 13 can determine, from the positions of the FS byte or of the block of 8 FS bytes known to it, the associated LL, and assign a detected bit error to the respective LL and thus to the associated transmission line. In this way, the detector unit can already determine the bit error rate (the number of incorrectly transmitted bits per time unit) specifically for each transmission line.

Naturally, it is also possible to indicate, for every other previously known position of one or more blocks of bytes for the reception of a previously known bit structure, a corresponding relation, which makes it possible into which LL a byte of a defined position of a special line of the frame falls. A corresponding calculation specification can be sent to the detector unit by a unit which is not further represented via the signal $S_{ci}$.

The detector unit 13 can also determine the specific bit error rates for incorrectly transmitted "0" bits and "1" bits (per transmission lines). For this purpose, the still scrambled reception signal $E_s$ can also have been sent to the detector unit 13. With it, the detector unit 13 can determine whether in the scrambled signal $E_s$ at the detected location of a bit error, the (incorrectly transmitted) bit in question has the value of logical "0" and logical "1." In addition, the detector unit 13 can also determine information on the type of a bit error, for example, within which bit structure (that is, a certain number of bits transmitted to left and right of the bit error position) the incorrectly transmitted bit is located. From this, if applicable, inferences regarding the error causes can be drawn.

Since the digital transmit signal S and thus also the sub-signals $S_1$, $S_2$, $S_3$, $S_4$ in the embodiment of a transmission system 1 represented in FIG. 1 are scrambled, the detector unit 13 must determine, for the determination of the type of bit error, whether a bit value "0" in a transmission line $5a$, $5b$, $5c$, $5d$ has been falsified to a bit value "1" or vice versa. For this purpose, the still scrambled reception signal $E_s$ is sent to the detector unit 13, so that the detector unit, after the determination of the bit position of a bit error, can detect whether this bit is obtained in the scrambled reception signal $E_s$ as a "0" or "1" bit. As function of this, the bit error can then be assigned the specific bit error rate for "0" or for "1" (that is, in this way the probability that a "0" bit is transmitted or detected by mistake as a "1" bit or that a "1" bit is transmitted or detected by mistake as a "0" bit can be detected).

The detector unit 13 can also determine the frequency of the occurrence of certain bit errors within a defined bit structure (a defined number of bits transmitted on the left and right of the bit error position).

For example, in the case of optical transmission lines, certain specific bit error (frequencies) can be explained by certain error mechanisms, for example, by an undercompensated or overcompensated dispersion of the line. The respective specific bit error frequency can then be used to control a variable, controllable dispersion compensator as a function of the respective specific bit error rate, or to adjust it in such a way that the specific bit error rate reaches a minimum or falls below a specified limit value.

In the simplest case, the specific bit error rates assigned to one of the transmission lines 5a, 5b, 5c, 5d can be used to control the receiver interfaces 15a, 15b, 15c, 15d that are contained in the receiving unit 7 and receive the sub-signals $S_1$, $S_2$, $S_3$, $S_4$ sent in each case, with regard to this decider threshold for distinguishing the bit values of logical "0" from logical "1," in such a way that the respective specific bit error rate reaches a minimum or falls below a specified limit value. This is represented in FIG. 1 by the control signal $S_c$, which is sent to the receiving unit 7 by detector unit 13.

By the determination of specific parameters, which characterize the performance or transmission quality of the individual transmission lines (optionally including the receiver interface 15a, 15b, 15c, 15d), the performance or the transmission quality of the entire transmission line (consisting of several parallel transmission lines) can be evaluated or optimized.

Figure 4:
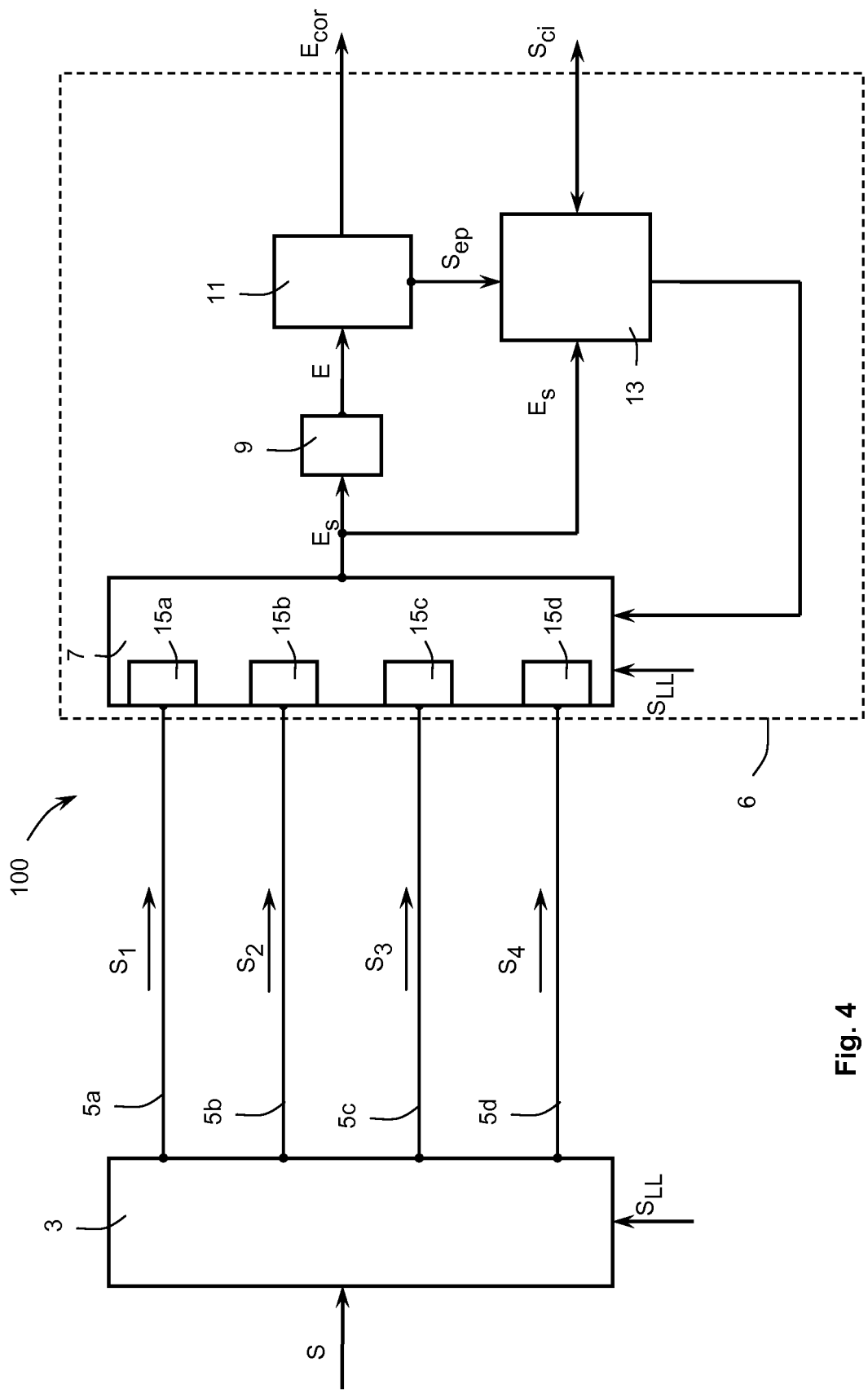
FIG. 4, a schematic block diagram similar to FIG. 1 of a second embodiment of a system for transmission of a signal system in inverse multiplexing.

The additional embodiment of a system 100 for the transmission of a signal in inverse multiplexing, which is represented in FIG. 4, is similar in its structure to the embodiment according to FIG. 1. Identical functional units and signals are therefore provided with the same reference numerals. The system 100 differs from the system 1 according to FIG. 1 in that, for the determination of at least one parameter which characterizes the transmission quality of the transmission lines assigned to each sub-signal and/or allows inferences concerning which error mechanisms negatively affected the transmission line of its transmission quality, a previously known bit structure which is written on the transmit side into the digital transmit signal S is no longer used. Instead, the detection of bit errors is carried out in practically any positions within the digital reception signal which has optionally been descrambled with the descrambler 9 (at least in the area of the payload) by means of a FEC unit 11. The FEC unit 11 determines at least the byte positions of the bit errors in the digital reception signal E and transmits this information to the detector unit 13 (represented in FIG. 4 by the signal $S_{ep}$). For example, the FEC unit for this purpose can transmit the number of the byte and the number of the line within the respective frame of the reception signal E to the detector unit 13. The latter can then back calculate, in the manner explained above in connection with FIG. 1, from the byte position within the frame, to determine the associated LL and thus the associated transmission line 5a, 5b, 5c, 5d. In this way, the bit error rate can be determined for each transmission line 5a, 5b, 5c, 5d.

As explained above, however, it is also naturally possible with this embodiment to determine in the same way specific bit error rates or other information on what the bit error type is. For this purpose, one must then obviously determine not only the byte position of a bit error, but also other parameters, such as the bit structure which surrounds the bit error, and whether the incorrectly received bit (or by inference: the respective sent) bit is a "0" or logical "1" bit.

If the transmit signal is transmitted scrambled via the transmission lines 5a, 5b, 5c, 5d, then the reception signal $E_s$ can again be sent to detector unit 13, as shown in FIG. 4. The detector unit 13 can determine, based on the signal $E_s$ and using the known position of the signal $E_s$ whether the incorrectly received (of by inference: the respective sent) bit is a "0" and logical "1" bit or what bits were adjacent to the incorrect bit (on the respective transmission line 5a, 5b, 5c, 5d).

The information determined in this way can then, as above, be explained in connection with the embodiment according to FIG. 1, for the evaluation or verification of the performance of the entire transmission line or the individual transmission lines 5a, 5b, 5c, 5d or for the control of units, particularly of the interfaces 15a, 15b, 15c, 15d of the receiving unit 7.

Figure 5:
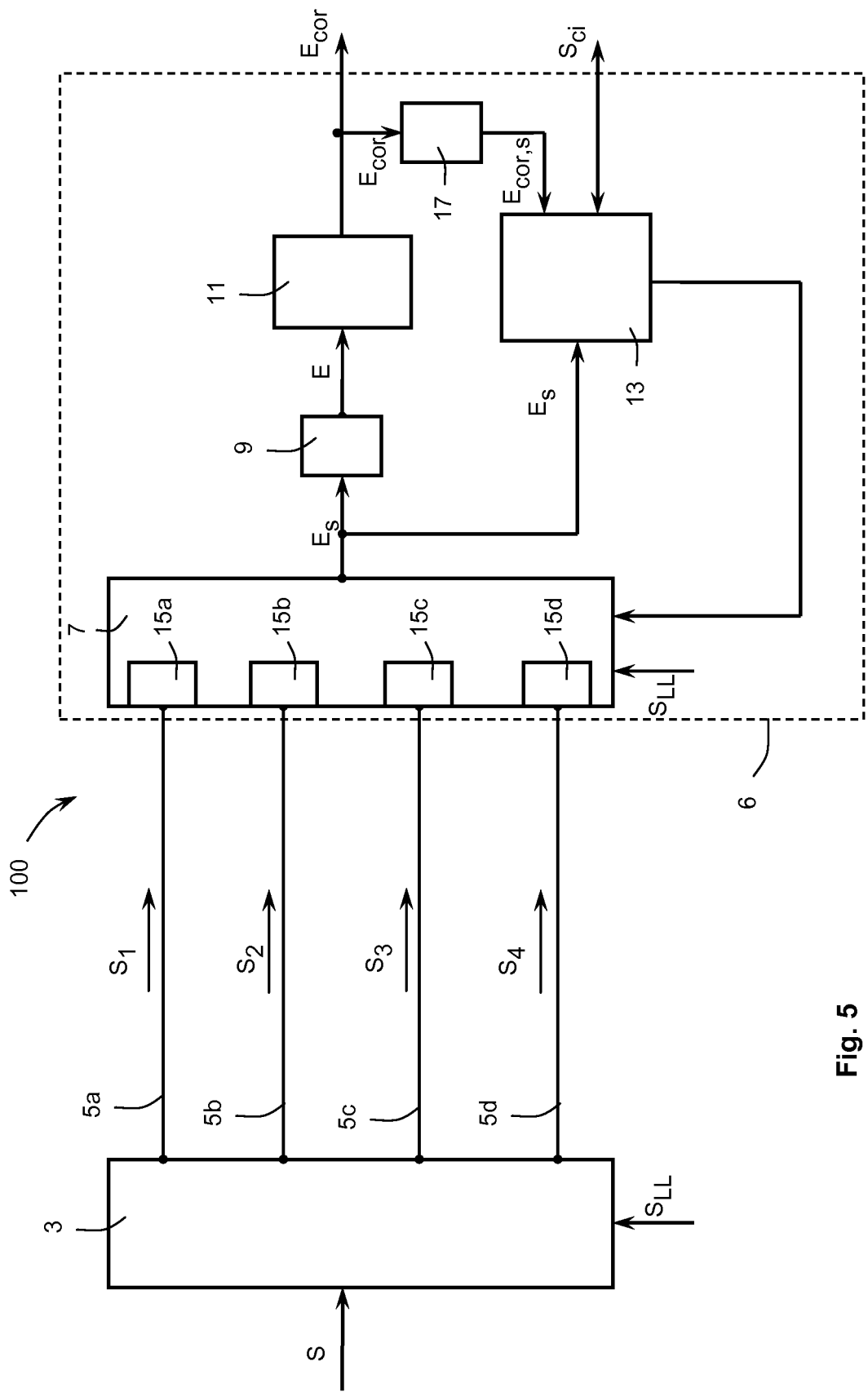
FIG. 5, a schematic block diagram of a variant of the embodiment of a system for transmission of a digital signal in inverse multiplexing according to FIG. 4.

FIG. 5 shows a variant of the embodiment of a transmission system 100 according to FIG. 4, where the FEC unit no longer has to send the byte position (or the bit position) of an incorrect bit to the detector unit. However, this can still take place, but with this solution it is no longer absolutely necessary.

Because here the reception signal $E_{cor,s}$ which had already undergone error correction previously and was scrambled again by a scrambler 17 is sent to the detector unit 13, where the scrambling is carried out in an identical manner as for the purpose of the transmission of the digital transmit signal S. In this way, the detector unit 13 can then compare the scrambled, error corrected reception signal $E_{cor,s}$ (which is identical with high degree of certainty to the scrambled transmit signal, at least if no uncorrectable errors occur) with the scrambled, uncorrected reception signal $E_s$. From this, the byte or even bit position of an incorrectly transmitted bit can be determined, and in the same way, as described above, it is possible to back calculate back to the LL and assign to the respective transmission line 5a, 5b, 5c, 5d.

Finally, it should be pointed out that the units represented in FIGS. 1, 4 and 5, particularly the units which are a part of the reception device 6, do not have to be designed as stand-alone units, rather, the functionalities in question can be implemented in one or several physical units, by means of hardware or software.

The invention claimed is:

1. A method for the transmission of a digital signal in inverse multiplexing via an Optical Transport Network (OTN), the method comprising:
   (a) splitting a digital transmit signal, comprising a data signal carrying data traffic to be transmitted via the OTN, into a certain number M of several sub-signals and assigning individual bytes of respective sub-signals to a different respective one of multiple transmission lines of the OTN, where each sub-signal of a transmit side of a transmission line of the OTN assigned exclusively to this sub-signal is transmitted to a reception side of the assigned transmission line, and
   (b) in which, on the reception side of the transmission lines, the sub-signals are reassembled to a digital reception signal;
   (c) on the reception side, bit errors in the digital reception signal including their position in the digital reception signal are detected,
   (d) from the detected position of the bit errors and from the assignment of the individual bytes of the digital reception signal to the respective sub-signals and transmission lines, which assignment is also known on the reception side, it is determined to which sub-signal the detected bit errors were assigned, and
   (e) from the determination of (d), one or more adjustable parameters are determined, which characterize the transmission quality of the transmission lines assigned to each sub-signal or provide inferences regarding which error mechanisms of the transmission line in question impact its transmission quality.

2. The method according to claim 1, wherein the digital transmit signal has a frame structure, where the digital transmit signal is preferably split into several Logical Lanes which in each case contain a certain number of bytes of the digital transmit signal, and where in each case one or more Logical Lanes are combined to a number M of several sub-signals, where the assignment of the digital transmit signal to the Logical Lanes and the assignment of the Logical Lanes to the sub-signals, is also known on the reception side.

3. The method according to claim 2, wherein for selected or all of the transmission lines, as parameters, the bit error rate is determined, or, by the detection of whether the incorrectly transmitted bit is a logical "0" bit or a logical "1" bit, the specific bit error rates for the bit values of logical "0 " and logical "1" are determined.

4. The method according to claim 2, wherein as a function of the determined parameters, parameters of the respective transmission line are adjusted in such a way that an optimal transmission quality for the digital transmit signal to be transferred is achieved.

5. The method according to one of claims 1-4, wherein:
(a) the digital signal to be transmitted contains redundancy to allow forward error correction,
(b) forward error correction is carried out on the reception side on the digital reception signal,
(c) by means of the forward error correction or by the comparison of the uncorrected signal with the error corrected signal, the bit position or at least the byte position of each correctable bit error is determined within the respective frame of the reception signal, and
(d) from the position of the bit error in the reception signal, it is determined to which Logical Lane or which sub-signal the detected bit errors should be assigned.

6. The method of claim 4, wherein the adjusted parameter is the overcompensation or undercompensation of the respective one of the M transmission lines.

7. The method of claim 4, wherein the adjusted parameter is the threshold of the receiver at the end of the respective transmission line for detecting "0" or "1".

8. The method according to claim 2, wherein,
(a) a previously known bit structure is written into one or more specified blocks of bytes of the digital transmit signal,
(b) on the reception side, the previously known bit structure is acquired in one or more corresponding specified blocks of bytes of the digital reception signal, which are also known on the reception side, and possible bit errors in the previously known bit structure are detected, and
(c) from the position of the bit error in the digital reception signal, it is determined to which sub-signal the detected bit errors should be assigned.

9. The method of claim 8, wherein the length of the previously known bit structure is chosen in such a way that the bit structure is transmitted distributed over the specified blocks of bytes of several frames, and in that preferably the beginning of the bit structure is placed on the first specified byte of a frame, where this frame preferably has a specified marker which is known on the reception side.

10. The method according to claim 8, wherein the positions of the specified blocks of bytes within the digital transmit signal are chosen in such a way that the bytes of the previously known bit structure are distributed over all the Logical Lanes or over all the sub-signals.

11. The method according to claim 8, wherein the position of the one or more specified blocks of bytes within each frame remains constant, and in that the assignment of the bytes or blocks of bytes to the Logical Lanes occurs according to a rolling system.

12. The method according to claim 11, wherein the previously known bit structure is transmitted successively a number of times at least corresponding to the number N of Logical Lanes, and wherein the rolling system and the position of the one or more specified blocks of bytes within each frame are chosen and adjusted to each other in such a way that after transmitting N times the previously known structure, the complete bit structure is obtained in each case once within each Logical Lane.

13. The method according to claim 5, wherein the digital transmit signal is scrambled before the splitting into sub-signals, and in that on the reception side the digital reception signal is descrambled, optionally before the forward error correction takes place.

14. The method according to claim 13, wherein, in addition to the detection of the bit error, a determination is carried out in the still scrambled digital reception signal, whether in the position of the incorrectly transmitted bits the bit value is equal to logical "0" or logical "1", and in that from this specific bit error rates are preferably determined for the bit values of logical "0" or a logical "1" for selected or for all of the transmission lines.

15. The method according to claim 13, wherein the still scrambled reception signal, and the descrambled error corrected reception signal, which has however been scrambled again identically, are compared, and by this comparison both the bit position of incorrectly transmitted bits, and also the information whether the incorrectly transmitted bit in the scrambled transmit signal initially was a logical "0" bit or a logical "1" bit, or whether the incorrectly transmitted bit in the scrambled reception signal is a logical "0"bit or a logical "1" bit.

16. The method according to claim 15, wherein by the comparison of the still scrambled reception signal and the descrambled error corrected reception signal, which has however been scrambled again identically, the bit positions or byte positions of the correctable errors are also determined.

17. A reception device for a system for the transmission of a digital signal in inverse multiplexing, in particular via an Optical Transport Network (OTN),
(a) in which a transmission device splits a digital transmit signal to be transmitted, which has a frame structure and comprises a data signal carrying data traffic to be transmitted via the OTN, into several Logical Lanes which each contain a specified number of bytes of the digital transmit signal,
(b) in which a transmission device splits a digital transmit signal to be transmitted into several sub-signals, and assigning individual bytes of respective sub-signals to a different respective one of multiple transmission lines of the OTN, and in each case each sub-signal is sent to a transmit side of a respective one of the transmission lines which is assigned exclusively to this sub-signal, and
(c) in which the reception device comprises a receiving unit configured for receiving the sub-signals on the multiple transmission lines, the receiving unit connected to a descrambler for assembling the sub-signals again to a digital reception signal,
(d) the reception device further comprising a detector unit configured for,
(i) in the digital reception signal
(1) acquiring a previously known bit structure, which was written by the transmit device into one or more specified blocks of bytes of the digital transmit signal, and detecting possible bit errors with the acquisition of the location in the digital reception signal; and
(ii) from a determined location of the detected bit errors in the digital sub-signal and from the assignment, known to the reception device, of the individual bytes of the digital reception signal to the respective sub-signals and transmission lines, determining to which sub-signal the detected bit errors should be assigned, and (iii) from the determination of (ii), determining one or more parameters, which characterize the transmission quality of the transmission lines assigned to each sub-signal, or provide inferences regarding which error mechanisms of the transmission line in question impact its transmission quality.

18. The device of claim 17, wherein:
(a) the digital signal to be transmitted contains redundancy to allow forward error correction;
(b) a forward error correction unit is adapted to perform forward error correction on the reception side on the digital reception signal;
(c) by means of the forward error correction or by the comparison of the uncorrected signal with the error corrected signal, the bit position or at least the byte position of each correctable bit error is determined within the respective frame of the reception signal, and
(d) from the position of the bit error in the reception signal, it is determined to which Logical Lane or which sub-signal the detected bit errors should be assigned;
(e) wherein the digital transmit signal is scrambled before the splitting into sub-signals, and in that on the reception side the digital reception signal is descrambled by the descrambler before the forward error correction takes place;
(f) wherein the still scrambled reception signal, and the descrambled error corrected reception signal, which has however been scrambled again identically, are compared, and by this comparison both the bit position of incorrectly transmitted bits, and also the information whether the incorrectly transmitted bit in the scrambled transmit signal initially was a logical "0" bit or a logical "1" bit, or whether the incorrectly transmitted bit in the scrambled reception signal is a logical "0" bit or a logical "1" bit.

19. A reception device for a system for the transmission of a digital signal in inverse multiplexing, in particular via an Optical Transport Network (OTN),
(a) in which a transmission device splits a digital transmit signal to be transmitted, which has a frame structure and comprises a data signal carrying data traffic to be transmitted via the OTN in a normal operating mode, into several Logical Lanes which each contain a specified number of bytes of the digital transmit signal,
(b) in which a transmission device splits a digital transmit signal to be transmitted into several sub-signals, assigning individual bytes of respective sub-signals to a different respective one of multiple transmission lines of the OTN, and in each case each sub-signal is sent to a transmit side of a transmission line of the OTN which is assigned exclusively to this sub-signal, and
(c) in which the reception device comprises a receiving unit configured for receiving the sub-signals on the multiple transmission lines, the receiving unit connected to a descrambler for assembling the sub-signals again to a digital reception signal,
(d) the reception device further comprising a forward error correction unit for applying forward error correction to the digital reception signal, which contains redundancy to allow forward error correction, to produce a corrected digital reception signal, and further comprising a detector unit configured for (i) by receiving a signal from the forward error correction unit or by comparing the corrected digital reception signal with the uncorrected digital reception signal, detecting possible bit errors with the acquisition of the location in the digital reception signal, (ii) from the determined location of the bit errors in the digital sub-signal and from the assignment, known to the reception device, of the individual bytes of the digital reception signal to the respective sub-signals and transmission lines, it is determined to which sub-signal the detected bit errors should be assigned, and (iii) from the determination of (ii), determining one or more adjustable parameters, which characterize the transmission quality of the transmission lines assigned to each sub-signal, or provide inferences regarding which error mechanisms of the transmission line in question impact its transmission quality.

20. The reception device of claim 19, wherein the still scrambled reception signal, and the descrambled error corrected reception signal, which has however been scrambled again identically, are compared, and by this comparison both the bit position of incorrectly transmitted bits, and also the information whether the incorrectly transmitted bit in the scrambled transmit signal initially was a logical "0" bit or a logical "1" bit, or whether the incorrectly transmitted bit in the scrambled reception signal is a logical "0" bit or a logical "1" bit.

* * * * *